Patented July 22, 1924.

1,502,079

UNITED STATES PATENT OFFICE.

ERIC HJALMAR WESTLING, OF REDWOOD CITY, CALIFORNIA, ASSIGNOR TO EMORY WINSHIP, OF SAN FRANCISCO, CALIFORNIA.

PROCESS OF MAKING LEAD NITRATE AND HYDRATED MANGANESE DIOXIDE.

No Drawing. Application filed October 4, 1923. Serial No. 666,444.

*To all whom it may concern:*

Be it known that I, ERIC HJALMAR WESTLING, a citizen of the United States, and a resident of Redwood City, county of San Mateo, and State of California, have invented a certain new and useful Process of Making Lead Nitrate and Hydrated Manganese Dioxide, of which the following is a specification.

An object of the invention is to provide a method of producing lead nitrate and hydrated manganese dioxide from inexpensive materials.

Another object of the invention is to produce lead nitrate and substantially chemically pure hydrated manganese dioxide from manganese nitrate solution and lead peroxide.

The invention possesses other objects and features of advantage, some of which, with the foregoing, will be set forth in the following description of my invention. It is to be understood that I do not limit myself to the showing made by the said description, as I may adopt varient forms of my invention within the scope of the claims.

Broadly considered my invention comprises the production of pure hydrated manganese dioxide, $MnO_2 \cdot H_2O$, and lead nitrate solution, $Pb(NO_3)_2$, from manganese nitrate solution and lead peroxide. By the use of my invention, I convert two inexpensive and little used salts into two valuable compounds for which there is a ready market.

In accordance with my invention, I prepare a solution of manganese nitrate, preferably by the method set forth in my United States Letters Patent No. 1,325,129. A suitable concentration of the manganese nitrate solution is one having a specific gravity of 1.2 but the reaction occurs even though the solution has a specific gravity greater or less than that mentioned.

To this solution of manganese nitrate, lead peroxide in powdered form is added. The mixture is then heated and agitated. The following reaction takes place:

$$Mn(NO_3)_2 + PbO_2 + H_2O = MnO_2 \cdot H_2O + Pb(NO_3)_2.$$

This complete reaction occurs only in a neutral or very nearly neutral solution. A slight acidity or basicity may be allowed. The temperature of the reaction should preferably be above 90° C., but the most complete results are obtained when the solution boils. This reaction is not reversible and proceeds to completion as expressed by the equation.

The manganese nitrate and lead peroxide are combined in substantially molecular proportions, but it is usually an advantage to have a slight excess of the manganese nitrate solution to make sure that no lead peroxide is left uncombined in the resulting solution to contaminate the hydrated manganese dioxide. The manganese dioxide precipitates and is removed preferably by filtration. The lead nitrate solution may then be concentrated and the lead nitrate recovered by crystallization.

I claim:

1. The process of producing hydrated manganese dioxide and lead nitrate which comprises reacting manganese nitrate with lead peroxide.

2. The process of producing lead nitrate from manganese nitrate and lead peroxide, which comprises heating a mixture of lead peroxide and manganese nitrate solution and separating the resultant precipitate.

3. The process of producing lead nitrate from manganese nitrate and lead peroxide, which comprises heating a mixture of manganese nitrate solution and lead peroxide, separating the precipitate and recovering lead nitrate by crystallization.

4. The process of producing hydrated manganese dioxide and lead nitrate solution, which comprises heating a mixture of manganese nitrate solution and lead peroxide to boiling.

5. The process of producing hydrated manganese dioxide and lead nitrate solution from manganese nitrate and lead peroxide, which comprises adding lead peroxide to substantially neutral solution of manganese nitrate and agitating and heating the mixture.

6. The process of producing hydrated manganese dioxide and lead nitrate solution from manganese nitrate and lead peroxide, which comprises adding lead peroxide to a solution of manganese nitrate having a specific gravity of approximately 1.2 and boiling the mixture.

In testimony whereof, I have hereunto set my hand.

ERIC HJALMAR WESTLING.